(12) United States Patent
Li et al.

(10) Patent No.: US 10,476,407 B2
(45) Date of Patent: Nov. 12, 2019

(54) MOVABLE TYPE MAGNETIC SUSPENSION APPARATUS

(71) Applicant: ZHAOQING HENGYI INDUSTRIAL COMPANY LTD, Zhaoqing (CN)

(72) Inventors: Caili Li, Zhaoqing (CN); Yunchuan Wang, Zhaoqing (CN); Xiaobing Wang, Zhaoqing (CN); Liangqing Li, Zhaoqing (CN)

(73) Assignee: ZHAOQING HENGYI INDUSTRIAL COMPANY LTD., Zhaoqing (CN)

( * ) Notice: Subject to any disclaimer, the term of this patent is extended or adjusted under 35 U.S.C. 154(b) by 129 days.

(21) Appl. No.: 15/737,177

(22) PCT Filed: Jun. 6, 2016

(86) PCT No.: PCT/CN2016/085008
§ 371 (c)(1),
(2) Date: Dec. 15, 2017

(87) PCT Pub. No.: WO2016/202187
PCT Pub. Date: Dec. 22, 2016

(65) Prior Publication Data
US 2018/0175750 A1    Jun. 21, 2018

(30) Foreign Application Priority Data

Jun. 16, 2015 (CN) .......................... 2015 1 0337505

(51) Int. Cl.
*H02K 7/09* (2006.01)
*H02N 15/00* (2006.01)
*B65G 54/02* (2006.01)

(52) U.S. Cl.
CPC ............. *H02N 15/00* (2013.01); *B65G 54/02* (2013.01)

(58) Field of Classification Search
CPC .................................. H02K 7/09; H02N 15/00
See application file for complete search history.

(56) References Cited

U.S. PATENT DOCUMENTS

| 2009/0033315 | A1  | 2/2009 | Kawashima et al. |
|---|---|---|---|
| 2015/0044938 | A1* | 2/2015 | Chieffo ................ A63H 33/26 446/256 |
| 2016/0065098 | A1* | 3/2016 | Stipe ...................... H02N 15/00 310/90.5 |

FOREIGN PATENT DOCUMENTS

| CN | 1767349 A1 | 5/2006 |
|---|---|---|
| CN | 102315805 A1 | 1/2012 |

(Continued)

OTHER PUBLICATIONS

Written Opinion of the International Searching Authority for PCT/CN2016/085008, dated Sep. 9, 2016.

*Primary Examiner* — Dang D Le
(74) *Attorney, Agent, or Firm* — Flener IP & Business Law; Zareefa B. Flener

(57) ABSTRACT

Disclosed is a movable type magnetic suspension apparatus, comprising: a suspension body (1) having a magnet (2); and a magnetic suspension base (3), the magnetic suspension base comprising: a magnetic suspension mechanism (4) for suspending the suspension body at a predetermined distance thereabove; and a displacement mechanism for displacing the magnetic suspension mechanism to cause the suspension body in a suspended state to displace. The movable type magnetic suspension apparatus enables the suspension body to move in air along a predetermined trajectory and can substantially expand application fields of the magnetic suspension apparatus.

18 Claims, 5 Drawing Sheets

(56) References Cited

FOREIGN PATENT DOCUMENTS

| | | | |
|---|---|---|---|
| CN | 104901587 | A1 | 9/2015 |
| CN | 204835984 | U | 12/2015 |
| SU | 1788933 | A3 | 1/1993 |

* cited by examiner

MOVABLE TYPE MAGNETIC SUSPENSION APPARATUS

FIELD OF THE DISCLOSURE

The present disclosure generally relates to the field of magnetic suspension apparatus, and specifically to a magnetic suspension apparatus whose suspension body changes position in space.

BACKGROUND OF THE DISCLOSURE

A known magnetic suspension apparatus such as a magnetic suspension desk lamp or a magnetic suspension gyroscope generally includes a base and a suspension body, the base and the suspension body both include a magnet, and the magnet in the base, through magnetic action (e.g., magnetic repulsion force), can make the suspension body suspend at a predetermined distance above the base, thereby generating a floating fantastic visual effect and appealing to people.

However, in the known magnetic suspension apparatus, the base usually remains stationary and the suspension body can only suspend at a specific position; in addition, it is still necessary to manually complete an aligned suspension procedure of the suspension body, which results in limitation on application fields of the magnetic suspension apparatus.

SUMMARY OF THE DISCLOSURE

One of objects of the present disclosure is to provide a movable type magnetic suspension apparatus, which enables the suspension body to change spatial positions in a suspended state.

According to a first aspect of the present disclosure, there is provided a movable type magnetic suspension apparatus, comprising:
 a suspension body having a magnet; and
 a magnetic suspension base, comprising:
  a magnetic suspension mechanism for suspending the suspension body at a predetermined distance thereabove; and
  a displacement mechanism for displacing the magnetic suspension mechanism to enable the suspension body in the suspended state to displace correspondingly.

In some embodiments of the present disclosure, the displacement mechanism comprises a horizontal component displacement mechanism for enabling the magnetic suspension mechanism to displace in a horizontal direction. For example, the horizontal component displacement mechanism may be a horizontally rotational displacement mechanism for enabling the magnetic suspension mechanism to make rotational movement in a horizontal plane.

In some embodiments of the present disclosure, the displacement mechanism comprises a vertical component displacement mechanism for enabling the magnetic suspension mechanism to displace in a vertical direction.

In some embodiments of the present disclosure, the displacement mechanism comprises a turn-over displacement mechanism for enabling the magnetic suspension mechanism to turn and tilt. In this case, if the magnetic suspension mechanism only turns over about its own horizontal axis without making a translational movement, the suspension body also only makes a turn-over movement without making a translational movement.

In some embodiments of the present disclosure, the magnetic suspension base has a first critical anti-horizontal deviation mechanism, the suspension body has a second critical anti-horizontal deviation mechanism, the first critical anti-horizontal deviation mechanism and the second critical anti-horizontal deviation mechanism are configured to mate with each other so as to prevent the suspension body from excessive horizontal deviation that would cause failure of normal suspension of the suspension body when the suspension body is located on the magnetic suspension base and when the suspension body is at a suspension critical point while the magnetic suspension mechanism rises.

In some embodiments of the present disclosure, the first critical anti-horizontal deviation mechanism is an engagement protrusion disposed on a top surface of the magnetic suspension base, the second critical anti-horizontal deviation mechanism is an engagement recess disposed on a suspension bottom surface of the suspension body, and the engagement recess is configured to receive the engagement protrusion. In this case, the engagement protrusion is preferably cylindrical, conical or truncated conical, and the engagement recess is preferably cylindrical, conical or truncated conical correspondingly.

In some embodiments of the present disclosure, the first critical anti-horizontal deviation mechanism is an engagement concave formed on a top surface of the magnetic suspension base, the second critical anti-horizontal deviation mechanism is formed by an outer profile of the suspension body itself so that the suspension body is received in the engagement concave in a manner that the horizontal movement is limited.

In some embodiments of the present disclosure, transmission between the displacement mechanism and the magnetic suspension mechanism is performed via a screw rod transmission device, a gear transmission device or a belt transmission device.

In some embodiments of the present disclosure, the displacement mechanism is a conveying cart, and the magnetic suspension mechanism is carried by the conveying cart.

In some embodiments of the present disclosure, the displacement mechanism is a guide rail device having a predetermined path and configured to enable the magnetic suspension mechanism to displace along its predetermined path.

In some embodiments of the present disclosure, movable type magnetic suspension apparatus further comprises a controller for controlling the displacement mechanism.

According to a second aspect of the present disclosure, there is provided an automatic magnetic suspension apparatus, comprising:
 a suspension body having a magnet and having a self-rotation axis; and
 a magnetic suspension base, comprising:
  a magnetic suspension mechanism for enabling the suspension body to suspend at a predetermined distance thereabove in a way of freely (horizontally) rotating about its self-rotation axis; and
  a lifter for lifting the magnetic suspension mechanism,
 wherein the magnetic suspension base has a first critical anti-horizontal deviation mechanism, the suspension body has a second critical anti-horizontal deviation mechanism, the first critical anti-horizontal deviation mechanism and the second critical anti-horizontal deviation mechanism are configured to mate with each other so as to prevent the suspension body from excessive horizontal deviation that would cause failure of normally automatic float of the suspension body from the magnetic suspension base when the suspension body is located on the magnetic suspension base and when the suspension body is at a suspension critical point while the magnetic suspension mechanism rises.

In some embodiments of the present disclosure, the first critical anti-horizontal deviation mechanism may be an engagement protrusion disposed on a top surface of the magnetic suspension base, the second critical anti-horizontal deviation mechanism may be an engagement recess disposed on a suspension bottom surface of the suspension body, and the engagement recess is configured to initially receive the engagement protrusion.

In some embodiments of the present disclosure, the engagement protrusion may be cylindrical, conical or truncated conical, and the engagement recess may be cylindrical, conical or truncated conical correspondingly.

In some embodiments of the present disclosure, the first critical anti-horizontal deviation mechanism is an engagement concave formed on a top surface of the magnetic suspension base, the second critical anti-horizontal deviation mechanism is formed by an outer profile of the suspension body itself so that the suspension body is received in the engagement concave in a manner that the horizontal movement is limited.

In some embodiments of the present disclosure, one of the first critical anti-horizontal deviation mechanism and the second critical anti-horizontal deviation mechanism may be an engagement recess having a vertical centrosymmetrical axis, the other of the first critical anti-horizontal deviation mechanism and the second critical anti-horizontal deviation mechanism may be an engagement protrusion having a vertical centrosymmetrical axis, and the vertical centrosymmetrical axis of the engagement recess, the vertical centrosymmetrical axis of the engagement protrusion and the self-rotation axis of the suspension body substantially overlap during automatic suspension of the suspension body from the magnetic suspension base.

In some embodiments of the present disclosure, one of the first critical anti-horizontal deviation mechanism and the second critical anti-horizontal deviation mechanism may be an engagement recess, the other of the first critical anti-horizontal deviation mechanism and the second critical anti-horizontal deviation mechanism may be an engagement protrusion, and the engagement recess receives the engagement protrusion and they form a clearance fitting when the suspension body is initially placed on the magnetic suspension base; during automatic suspension of the suspension body from the magnetic suspension base, the engagement recess and the engagement protrusion substantially align along the self-rotation axis of the suspension body. The above clearance is usually 1-3 mm, preferably 1-2 mm.

In some embodiments of the present disclosure, the lifter may comprise a lifting mechanism and a motor, and the lifting mechanism and the motor are arranged side by side to minimize a height of the magnetic suspension base.

According to a third aspect of the present disclosure, there is provided a method of assembling an automatic magnetic suspension apparatus, comprising:
providing a suspension body having a magnet and having a self-rotation axis; and
providing a magnetic suspension base, comprising:
a magnetic suspension mechanism for enabling the suspension body to suspend at a predetermined distance thereabove in a way of freely (horizontally) rotating about its self-rotation axis; and
a lifter for lifting the magnetic suspension mechanism, providing one of an engagement protrusion and an engagement recess on a top surface of the magnetic suspension base;
providing, on a suspension bottom surface of the suspension body, the other of the engagement protrusion and the engagement recess with a geometrical center substantially in the self-rotation axis, the engagement recess being configured to receive the engagement protrusion and forming a clearance fitting with the engagement protrusion;
enabling the suspension body to suspend above the magnetic suspension base;
moving the magnetic suspension mechanism horizontally to adjust the self-rotation axis of the suspension body to substantially run through a geometrical center of the one of the engagement protrusion and engagement recess provided on the top surface of the magnetic suspension base; and
fixing the duly-adjusted magnetic suspension mechanism relative to the magnetic suspension base to thereby complete the assembling procedure.

The automatic magnetic suspension apparatus according to the present disclosure can effectively achieve automatic suspension of the suspension body and minimize occurrence of automatic suspension failures.

Another object of the present disclosure is to provide a magnetic suspension apparatus which can effectively increase a net suspension height of the suspension body.

According to a fourth aspect of the present disclosure, there is provided a magnetic suspension apparatus, comprising:
a suspension body having a permanent magnet; and
a magnetic suspension mechanism which suspends the suspension body at a predetermined distance thereabove, and comprises:
a central permanent magnet; and
an annular permanent magnet disposed around the central permanent magnet and spaced apart from the central permanent magnet,
wherein when the suspension body normally suspends above the magnetic suspension mechanism, the magnetic polarity of a lower surface of the permanent magnet of the suspension body is the same as the magnetic polarity of an upper surface of the central permanent magnet but opposite to the magnetic polarity of an upper surface of the annular permanent magnet.

In the present disclosure, the central permanent magnet may generate an upward strong magnetic repulsion force on the suspension body to balance gravity of the suspension body, and, due to further action of the annular permanent magnet, the suspension body does not turn over in a vertical plane so that the suspension body may suspend at an ideal predetermined height.

In an embodiment of the present disclosure, the annular permanent magnet is a uniform outer ring-shaped permanent magnet, and the central permanent magnet is a uniform inner cylindrical permanent magnet disposed concentrically with the outer ring-shaped permanent magnet.

In an embodiment of the present disclosure, the annular permanent magnet is a uniform outer ring-shaped permanent magnet, and the central permanent magnet is a uniform inner ring-shaped (hollow) permanent magnet disposed concentrically with the outer ring-shaped permanent magnet. In this case, a magnetic sensor of the control system may be disposed in a hollow cylinder (inner ring-shaped permanent magnet) to save space.

In some embodiments of the present disclosure, the magnetic suspension apparatus further comprises a horizontal electromagnetic control system disposed in the magnetic suspension mechanism to control, in real time, a deviation of the suspension body relative to the magnetic suspension mechanism in a horizontal direction. The horizontal electromagnetic control system comprises at least two groups of electromagnets, at least two magnetic sensors corresponding to said at least two groups of electromagnets, and a control circuit for respectively controlling at least two freedoms of the deviation of the suspension body away from the predetermined position in the horizontal direction. When the suspension body displaces in the horizontal direction from the predetermined position, the at least two magnetic sensors respectively generate corresponding control signals to respectively control excitation current of each group of electromagnets, so that the suspension body is made return to the predetermined position through a controllable magnetic force generated by the electromagnets.

Those skilled in the art should appreciate that the magnetic suspension apparatus according to the first aspect through the fourth aspect may introduce features or feature combinations from one another, unless the features or feature combinations are inapplicable obviously.

The magnetic suspension apparatus according to the present disclosure enables the suspension body to change spatial positions in a suspended state, and thereby substantially expands application fields of the magnetic suspension apparatus.

DETAILED DESCRIPTION OF PREFERRED EMBODIMENTS

The present disclosure will be further described below in conjunction with embodiments and figures. Those skilled in the art should appreciate that embodiments and figures are only intended to facilitate better understanding of the present disclosure and not to impose any limitations.

Figure 1:
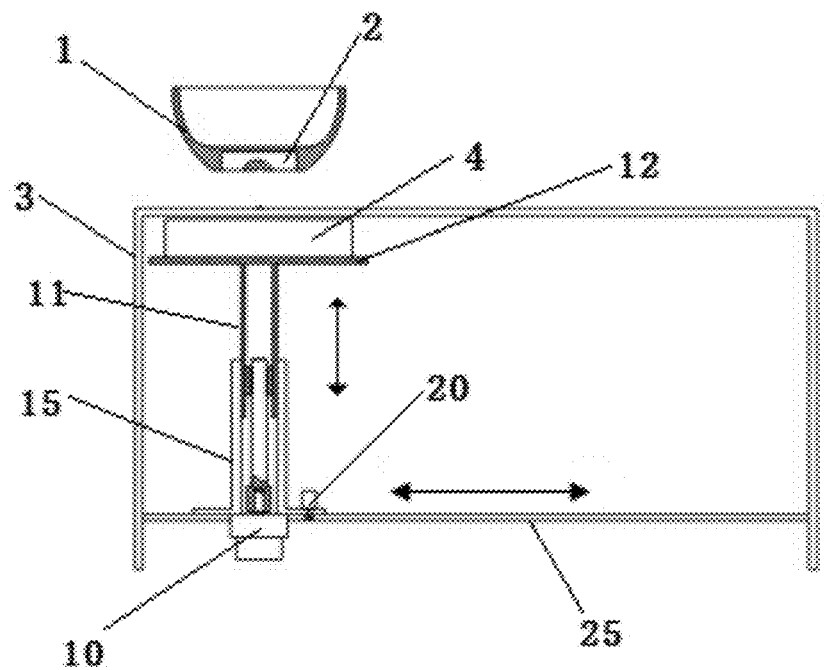
FIG. 1 is a schematic view of an embodiment of a movable type magnetic suspension apparatus according to the present disclosure.

Referring to FIG. 1, a movable type magnetic suspension apparatus according to the present disclosure mainly comprises a suspension body 1 and a magnetic suspension base 3. The suspension body 1 is initially located on the magnetic suspension base 3 and will suspend or float over the magnetic suspension base 3. The suspension body 1 comprises a magnet 2 which is preferably a permanent magnet. A shape of the magnet 2 may be set according to the needs of the suspension body 1, for example, the shape may be cylindrical, stepped, truncated conical or the like. The magnet 2 may be a whole magnet or formed by putting multiple magnets together.

The magnetic suspension base 3 has a magnetic suspension mechanism 4 and a displacement mechanism. The magnetic suspension mechanism 4 is provided with a magnet or a magnet group, which generates a magnetic repulsion force against the magnet in the suspension body 1 to suspend the suspension body 1 at a predetermined distance (position) above the magnetic suspension mechanism 4. The displacement mechanism is configured to displace the magnetic suspension mechanism 4 to cause the suspension body 1 in a suspended state to displace correspondingly. In the magnetic suspension mechanism 4 is usually provided a horizontal electromagnetic control system for controlling, in real time, a deviation of the suspension body 1 relative to the magnetic suspension mechanism 4 in a horizontal direction.

When the suspension body 1 is in a stably suspended state, the displacement mechanism is configured to drive the magnetic suspension mechanism 4 to displace, and the suspension body 1 moves synchronously along with the movement of the magnetic suspension mechanism 4. The displacement mechanism may include a horizontal component displacement mechanism and/or a vertical component displacement mechanism. The horizontal component displacement mechanism enables the magnetic suspension mechanism 4 to displace in the horizontal component (horizontal plane). The vertical component displacement mechanism enables the magnetic suspension mechanism 4 to displace in the vertical component (vertical plane).

In the embodiment shown in FIG. 1, the horizontal component displacement mechanism comprises a horizontal rectilinear displacement mechanism 20, and the vertical component displacement mechanism comprises a vertical rectilinear displacement mechanism 10. The vertical rectilinear displacement mechanism 10 comprises a lifting rod (pipe) 11, a vertical guide rail 15 and a vertical driving mechanism. An upper end of the lifting rod 11 supports the magnetic suspension mechanism 4 via a tray or a bracket, and the vertical driving mechanism can drive the lifting rod 11 to move up and down along the vertical guide rail 15. The horizontal rectilinear displacement mechanism 20 is connected with the vertical rectilinear displacement mechanism 10, and comprises a horizontal guide rail 25 and a horizontal driving mechanism. The horizontal driving mechanism is capable of driving the whole of the vertical rectilinear displacement mechanism 10 to move leftward and rightward along the horizontal guide rail 25, thereby bringing the magnetic suspension mechanism 4 to move leftward and rightward and finally bringing the suspension body 1 to move leftward and rightward synchronously. In other embodiments, the horizontal rectilinear displacement mechanism 20 may be directly connected with the magnetic suspension mechanism 4 and directly drive the magnetic suspension mechanism 4 to move leftward and rightward; and the vertical rectilinear displacement mechanism 10 is connected with the horizontal rectilinear displacement mechanism 20 so that during upward and downward movement, the vertical rectilinear displacement mechanism 10 brings the whole of the horizontal rectilinear displacement mechanism 20 to move up and down, thereby bringing the magnetic suspension mechanism 4 to move up and down and finally bringing the suspension body 1 to move up and down synchronously. The vertical driving mechanism and horizontal driving mechanism respectively include a motor and a transmission mechanism, wherein the transmission mechanism may employ screw rod transmission, gear transmission, belt transmission or the like.

Figure 2:
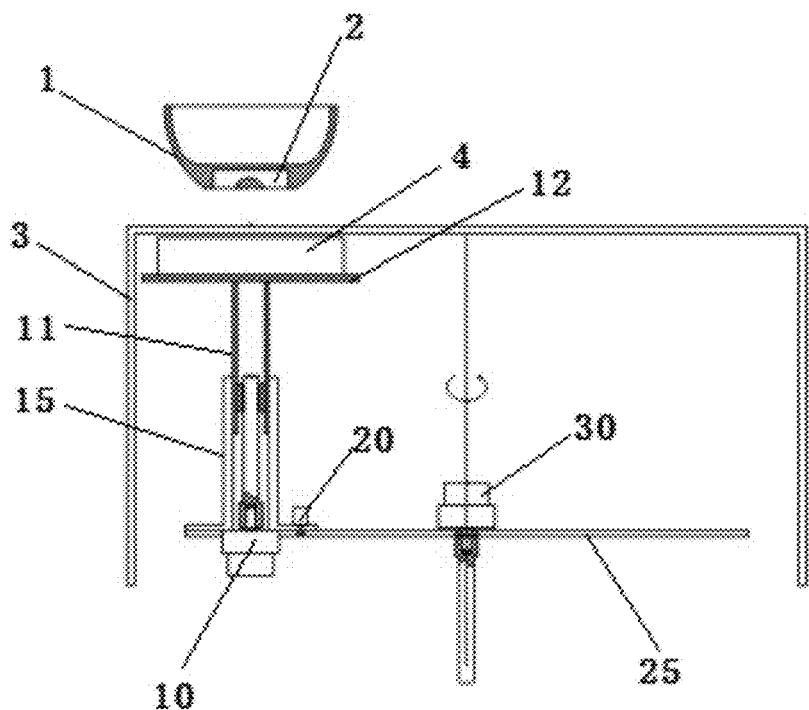
FIG. 2 is a schematic view of another embodiment of a movable type magnetic suspension apparatus according to the present disclosure.

FIG. 2 shows another embodiment of the present disclosure. On the basis of the embodiment shown in FIG. 1, the horizontal component displacement mechanism further comprises a horizontally rotational displacement mechanism 30 which is connected with the horizontal guide rail 25 and capable of driving the horizontal guide rail 25 to generate rotation movement in the horizontal plane, thereby bringing the magnetic suspension mechanism 4 to generate rotation movement in the horizontal plane and finally bringing the suspension body 1 to rotatably move synchronously in the horizontal plane.

Figure 3:
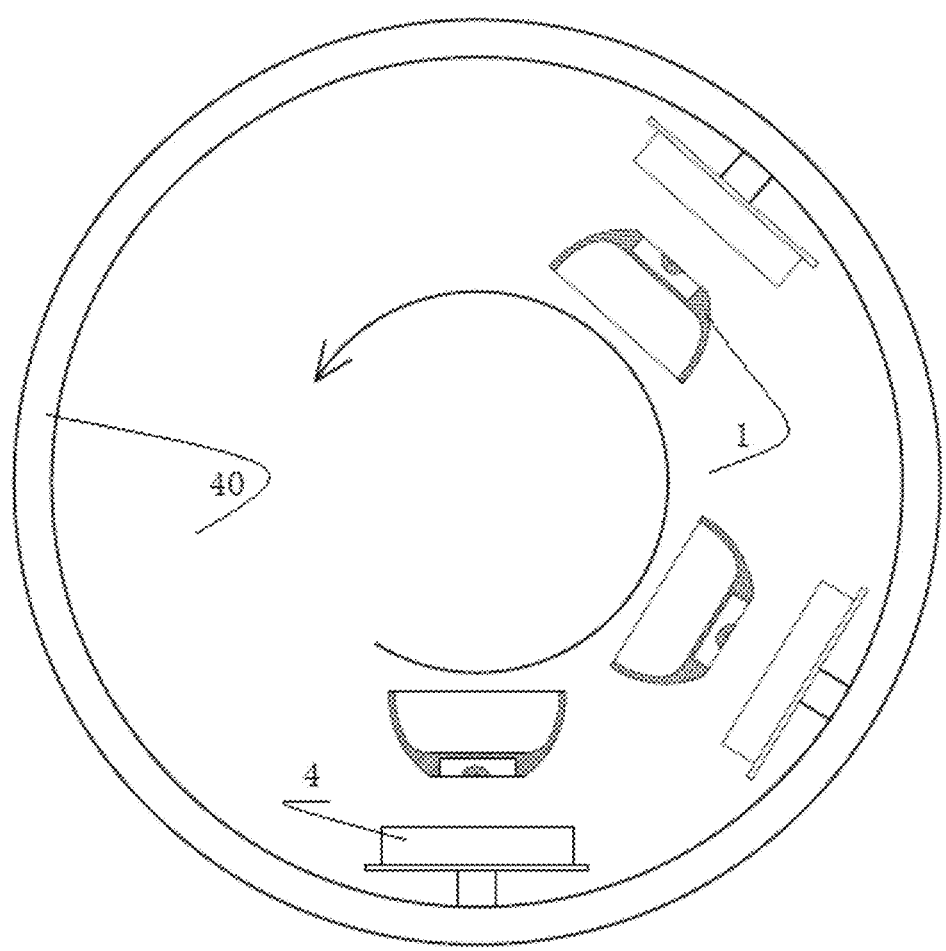
FIG. 3 is a schematic view of a further embodiment of a movable type magnetic suspension apparatus according to the present disclosure.

FIG. 3 shows a turn-over displacement mechanism of a further embodiment of the present disclosure. Different from the embodiments shown in FIG. 1 and FIG. 2, the magnetic suspension mechanism 4 in the embodiment shown in FIG. 3 no longer keeps a substantially horizontal orientation upon movement, but may turn and tilt and thereby bring the suspension body to turn and tilt therewith. A turning and tilting angle may not be limited. Stable suspension of the suspension body 1 relative to the magnetic suspension mechanism 4 may be achieved with a range of 360°. For example, when the magnetic suspension mechanism 4 turns and tilts 180° along a revolution guide rail 40, an extreme phenomenon that the suspension body 1 is suspended will occur. Those skilled in the art may appreciate that the aforesaid turn-over displacement mechanism is not limited to use of the revolution guide rail structure as shown in the figure, and it may employ any proper mechanism, for example, may employ a simple structure that the magnetic suspension structure 4 itself turns about a horizontal axis by a certain angle (for example less than 90°).

In other embodiments, the horizontal rectilinear displacement mechanism 20, the vertical rectilinear displacement mechanism 10 and the horizontally rotational displacement mechanism 30 or turn-over displacement mechanism may be combined in any manner or only one of the foregoing displacement mechanism may be employed.

Only several types of displacement mechanisms for moving the magnetic suspension mechanism 4 are listed in the above embodiments. Under guidance of the spirit of the present disclosure, those skilled in the art may design a movement trajectory (e.g., slope movement, or annular movement) of the magnetic suspension mechanism 4 according to specific application occasions, and employ a corresponding type of displacement mechanism to drive the magnetic suspension mechanism 4 to move according to a predetermined movement trajectory, and finally bring the suspension body 1 to move synchronously. The movable type magnetic suspension apparatus formed by variations of the displacement mechanisms all fall within the extent of protection of the present disclosure. For example, in some embodiments of the present disclosure, the displacement mechanism may be a conveying cart, the magnetic suspension mechanism 4 is carried by the conveying cart, and conveying cart is controlled to move to cause the synchronous movement of the suspension body 1. In some embodiments of the present disclosure, the displacement mechanism may be a guide rail device with a predetermined path (e.g., a conveyance belt), to enable the magnetic suspension mechanism 4 to displace along a predetermined path. On certain occasions, an operator may directly manually and randomly drive the magnetic suspension mechanism 4 to move.

In a known magnetic suspension apparatus, a suspension position of the suspension body needs to be manually found in an initial state to achieve stable suspension of the suspension body, which causes very unpleasant experience to the operator. In the present disclosure, the vertical component displacement mechanism may be enabled to also serve as an automatic suspension mechanism of the suspension body 1, and its specific implementation procedure will be further described hereunder.

Figure 4:
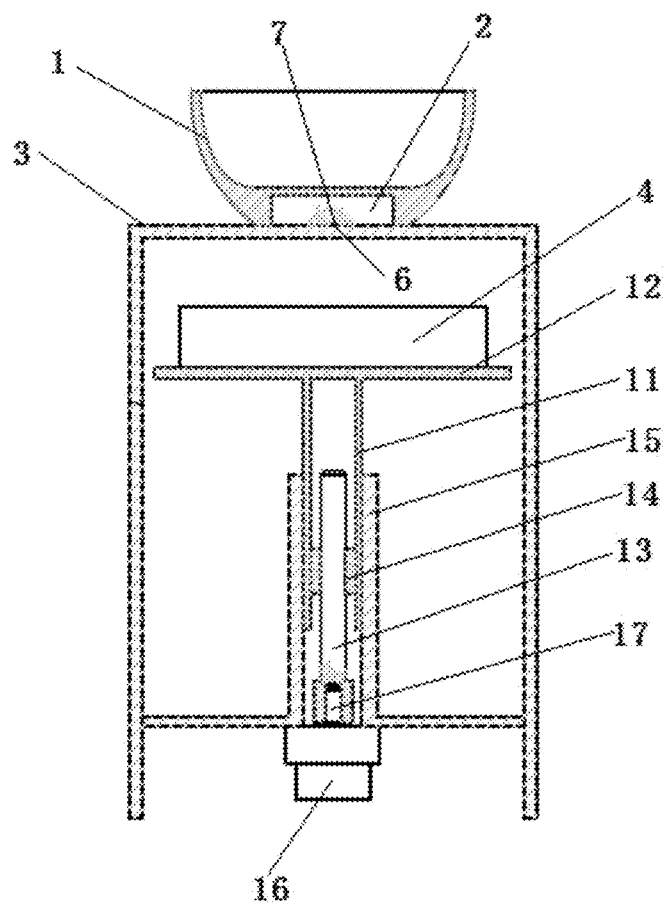
FIG. 4 is a schematic view of a movable type magnetic suspension apparatus including a vertical component displacement mechanism.

In the embodiment shown in FIG. 4, the vertical component displacement mechanism comprises a motor 16, a screw rod 13, a lifting pipe 11 and a vertical guide rail 15. The screw rod 13 is fixedly connected with an output shaft 17 of the motor 16. An upper end of the lifting pipe 11 supports the magnetic suspension mechanism 4 via a tray or bracket 12. An inner wall of the lifting pipe 11 is connected with the screw rod 13 via an internal thread 14, and an outer wall of the lifting pipe 11 is slideably connected with the vertical guide rail 15. The lifting pipe 11 is capable of sliding up and down relative to the vertical guide rail 15 but incapable of rotating, for example, a vertical positioning slot is provided on the guide rail 15, the outer wall of the lifting pipe 11 is provided with a positioning pin, and the positioning pin can only vertically move and cannot rotate in the positioning slot. When the motor 16 operates, the screw rod 13 drives the lifting pipe 11 to rise and fall along the vertical guide rail 15 and thereby bring the magnetic suspension mechanism 4 to rise and fall. Although the figure shows that the motor and the above lifting mechanism are arranged vertically in series, those skilled in the art may appreciate that according to needs, the motor 16 may also be arranged horizontally in parallel with the lifting mechanism such as the screw rod 13, to minimize the overall height of the magnetic suspension base.

The magnetic suspension base 3 and the suspension body 1 are respectively provided with critical anti-horizontal deviation mechanisms that mate (or engage) with each other, to prevent the suspension body 1 from excessive horizontal deviation that would cause failure of normal suspension of the suspension body 1 above the magnetic suspension base 3 when the suspension body 1 is located on the magnetic suspension base 3 and when the suspension body 1 is at a suspension critical point while the magnetic suspension mechanism 4 rises. In the embodiment shown in FIG. 4, the critical anti-horizontal deviation mechanism comprises an engagement protrusion 6 disposed on an upper surface of the magnetic suspension base 3 and an engaging groove 7 disposed on a lower surface of the suspension body 1. In other embodiments, it is also possible to provide an engagement protrusion on the lower surface of the suspension body 1, and provide an engagement recess on the upper surface of the magnetic suspension base 3 to form the critical anti-horizontal deviation mechanism. In the critical anti-horizontal deviation mechanism shown in FIG. 4, the engagement protrusion 6 preferably has a conical shape, and the cone may have a diameter of 3-10 mm and a height of 3-5 mm; the engaging groove 7 mating therewith has a conical mating surface having a corresponding size. The engagement protrusion 6 and engagement recess 7 are in smooth contact with each other. The engagement protrusion 6 and engagement recess 7 usually form a clearance fit to accommodate a manufacture error. On account of the manufacture error, it is necessary to, upon assembly, adjust the suspension position deviation of the engagement protrusion 6 relative to the engagement recess 7, as further described below.

First, when the suspension body 1 of the present disclosure suspends above the magnetic suspension base 3, it may freely rotate about its own (vertical) rotation axis. Upon manufacture, it is usual to try to ensure that the above self-rotation axis substantially passes through a geometrical center of the engagement recess 7. Although the engagement protrusion 6 is usually enabled to be centered and locate on a top surface of the magnetic suspension base 3 upon manufacture, due to various manufacturing error factors, when the suspension body 1 stably suspends above the magnetic suspension base 3, the self-rotation axis usually does not align with or aim at the engagement protrusion 6, namely, does not pass through the geometrical center of the engagement protrusion 6. Such misalignment would cause: while the lifter (e.g., the vertical component displacement mechanism) lifts the magnetic suspension mechanism 4, the suspension body 1 will not rise vertically from the top surface of the magnetic suspension base 3 when in a critical state, thereby causing failure of automatic suspension. To eliminate the problem, it is necessary to for example manually and horizontally move the magnetic suspension mechanism 4 upon final assembly, to adjust the self-rotation axis of the suspension body 1 to substantially pass through also the geometric center of the engagement protrusion 6 disposed on the top surface of the magnetic suspension base 3, and then fix the duly-adjusted magnetic suspension mechanism 4 relative to the magnetic suspension base 3 to thereby complete the assembly procedure. According to the assembled magnetic suspension apparatus, the self-rotation axis of the suspension body 1 has already been pre-adjusted in a suspended state to allow it to pass through the geometrical centers of both of the engagement recess 7 and engagement protrusion 6. Therefore, after the suspension body 1 is initially placed on the top surface of the magnetic suspension base 3 such that the engagement recess 7 and engagement protrusion 6 form clearance fitting, the suspension body 1 would stably disengage from the magnetic suspension base 3 to suspend automatically when the magnetic suspension mechanism 4 rises automatically and reaches a critical state.

In another embodiment of the present disclosure, although not illustrated, the critical anti-horizontal deviation mechanism may also employ the following structure: the top surface of the magnetic suspension base 3 forms (or has) an engagement concave which corresponds to an outer profile of the suspension body 1 itself, so that the suspension body can be received in the engagement concave in a manner that the horizontal movement is limited. For example, the top surface of the magnetic suspension base 3 has a cylindrical concave or recess, and the suspension body 1 is correspondingly in a shape of a cylinder having a slightly smaller diameter.

Figure 5:
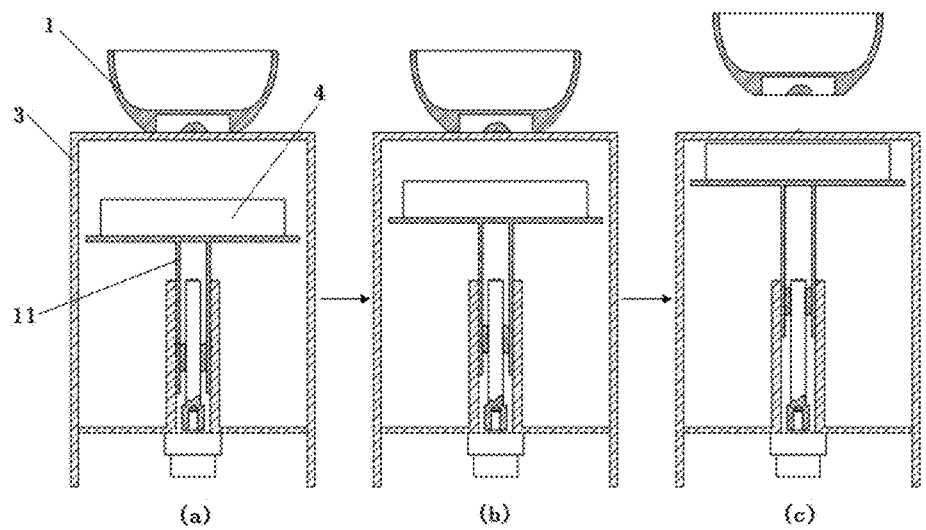
FIG. 5 is a schematic view of a suspension procedure of the movable type magnetic suspension apparatus shown in FIG. 3.

FIG. 5 is a schematic view of an automatic suspension procedure of the suspension body 1. FIG. 5(*a*) shows an initial state in which the magnetic suspension mechanism 4 is at a lower position, and the suspension body 1 is at an initial position on the magnetic suspension base 3 via the cooperation of the critical anti-horizontal deviation mechanism. At this time, the magnetic repulsion force between the magnetic suspension mechanism 4 and the suspension body 1 is smaller than gravity of the suspension body 1, and a horizontal electromagnetic control system disposed in the magnetic suspension mechanism 4 does not operate. The motor 16 is powered on, the lifting pipe 11 moves upward to enable the magnetic suspension mechanism 4 to move upward, and the magnetic repulsion force between the magnetic suspension mechanism 4 and the suspension body 1 gradually increases. FIG. 5(*b*) shows a critical state, i.e., when the magnetic repulsion force begins to be equal to the gravity of the suspension body 1, a friction force between the suspension body 1 and the magnetic suspension base 3 is zero. At this time, although the horizontal electromagnetic control system may start operation, the suspension body 1 may still quickly deviate from the center and would be hard to control, due to the impact of the horizontal component force caused by an asymmetrical error of the suspension system itself. The critical anti-horizontal deviation mechanism of the present disclosure mainly functions to assist in automatic suspension of the suspension body 1, and to prevent the excessive horizontal deviation that occurs when in the critical state during its automatic suspension. As the suspension body 1 floats upward, the critical anti-horizontal deviation mechanisms disengage from each other, and the horizontal electromagnetic control system beings to operate normally. FIG. 5(*c*) shows a suspended state. At this time, the magnetic suspension mechanism 4 is at a high position, the suspension body 1 is at a suspended position at a predetermined distance above the magnetic suspension mechanism 4, and the motor 16 stops operation. At this time, the magnetic repulsion force is equal to the gravity of the suspension body 1, the horizontal electromagnetic control system operates normally, the suspension body 1 does not excessively deviate in the horizontal direction relative to the magnetic suspension mechanism 4, and the suspension body 1 is in a stable suspended sate.

The automatic suspension of the suspension body 1 from the initial position to the suspended position is achieved through the rising movement of the lifting pipe 11. It is possible to overcome oscillation and deviation of the suspension body 1 in the horizontal direction when in the suspension critical state, under action of transition of the critical anti-horizontal deviation mechanism. Contrary to the above procedure, when the lifting pipe 11 moves downward, the magnetic suspension mechanism 4 moves from a high position to a low position. The magnetic repulsion force between the magnetic suspension mechanism 4 and the suspension body 1 reduces, and the suspension body 1 gradually falls under action of the gravity, thereby finally achieving automatic return of the suspension body 1 from the suspended position to the initial position.

In some embodiments of the present disclosure, the movable type magnetic suspension apparatus may comprise a controller which is connected with the driving motor of each displacement mechanism to control operation of the motor. The controller may be further integrated with a magnetic suspension control circuit or a control switch to control operation of the horizontal electromagnetic control system in the magnetic suspension mechanism 4.

In some embodiments of the present disclosure, the automatic magnetic suspension apparatus may further comprise a limiting mechanism for limiting the movement of the displacement mechanism. The limiting mechanism may be a limiting stop disposed on the magnetic suspension base 3. The limiting stop may be provided with a contact switch which is connected with the controller. When the displacement mechanism abuts against the limiting stop, the contact switch can send an electric signal to the controller, and the controller automatically stops operation of the driving motor.

Figure 6:
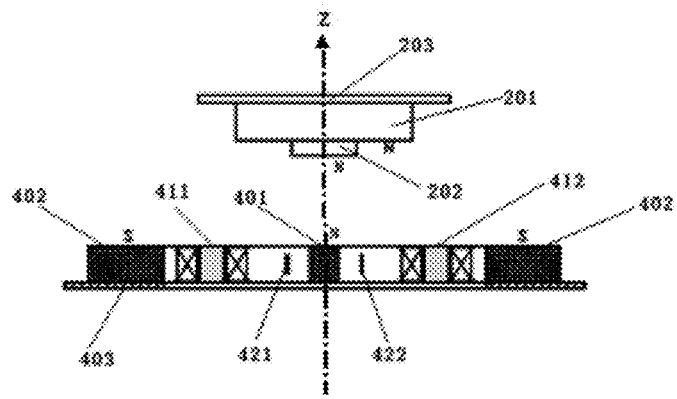
FIG. 6 is a front view of an embodiment of a suspension body and a magnetic suspension mechanism in the magnetic suspension apparatus according to the present disclosure.
Figure 7:
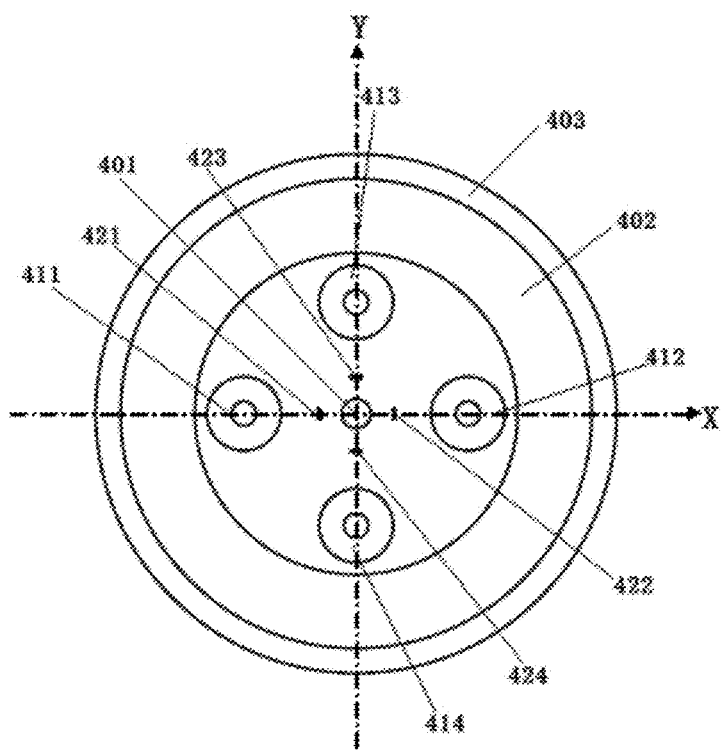
FIG. 7 is a top view of the magnetic suspension mechanism shown in FIG. 6.

FIGS. 6-7 show a specific embodiment of the suspension body and the corresponding magnetic suspension mechanism in the magnetic suspension apparatus according to the present disclosure. The magnet 2 in the suspension body is formed by laminating two cylindrical permanent magnets. An upper permanent magnet 201 has a diameter larger than a lower permanent magnet 202. This arrangement is well adapted to be disposed in a spherical suspension body. The magnetic suspension mechanism comprises a central permanent magnet 401, an annular permanent magnet 402 and the horizontal electromagnetic control system. The central permanent magnet 401 is a solid uniform cylinder. When the suspension body normally suspends above the magnetic suspension mechanism, the magnetic polarity of lower surfaces of the permanent magnets 201 and 202 is the same as the magnetic polarity of an upper surface of the central permanent magnet 401 but opposite to the magnetic polarity of the upper surface of the annular permanent magnet 402. The central permanent magnet 401 is disposed coaxially with the permanent magnets 201 and 202 so that the central permanent magnet 401 can generate a larger magnet repulsion force against the suspension body in a direction of Z axis to thereby suspend the suspension body to an ideal predetermined height. However, two magnets with the same polarity facing each other are usually slidingly repellent to each other, thus it is very difficult to suspend the suspension body only by virtue of the magnetic repulsion force of the central permanent magnet 401. In the present disclosure, the annular permanent magnet 402 is further provided around the central permanent magnet 401 such that the magnetic polarity of an upper surface of the annular permanent magnet 402 is opposite to the magnetic polarity of a lower surface of the permanent magnets 201 and 202, and thus the suspension body does not turn over in the vertical plane due to action of the annular permanent magnet 402. In a preferable case, a magnetic conductive sheet 203 is disposed on the upper surface of the permanent magnet 201, and a magnetic conductive sheet 403 is disposed on lower surfaces of the central permanent magnet 401 and annular permanent magnet 402. The guidance action of the magnetic conductive sheets 203 and 403 can make the magnetic field action between the suspension body and the magnetic suspension mechanism more centralized, thereby improving the efficiency.

In the above embodiment, the horizontal electromagnetic control system preferably comprises four electromagnets 411-414 and four corresponding Hall sensors (magnetic sensors) 422-424, wherein the four electromagnets 411-414 are distributed in a horizontal plane with the axes (X axis and Y axis) of the annular permanent magnet as a center, and then divided into two pairs each being connected in series or in parallel and symmetrically about the center, wherein ends of the same pair of electromagnets in the same orientation have opposite polarities upon energization such that when they act upon the permanent magnet 2 of the suspension body above the electromagnet pair, a horizontal force is combined and exerted on the permanent magnet 2. The combined horizontal force may control a horizontal freedom of the suspension body such that two pairs of mutually perpendicular electromagnets may control two freedoms in the horizontal plane and the suspension body is enabled to be balanced above the magnetic suspension base. A specific control circuit and a controlling principle are already publicly known by those skilled in the art, for example, reference may be made to the Chinese patent application CN1819436A, which is incorporated herein by reference in its entirety.

Figure 8:
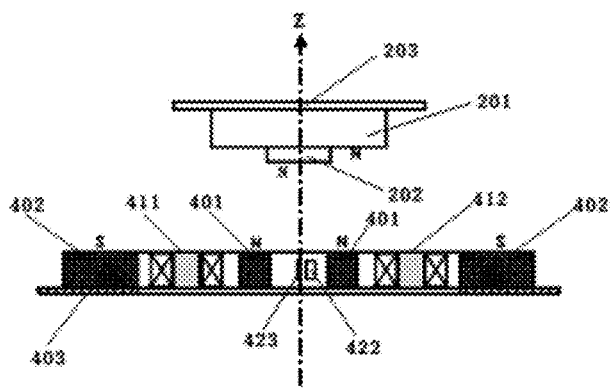
FIG. 8 is a front view of another embodiment of a suspension body and a magnetic suspension mechanism in the magnetic suspension apparatus according to the present disclosure.
Figure 9:
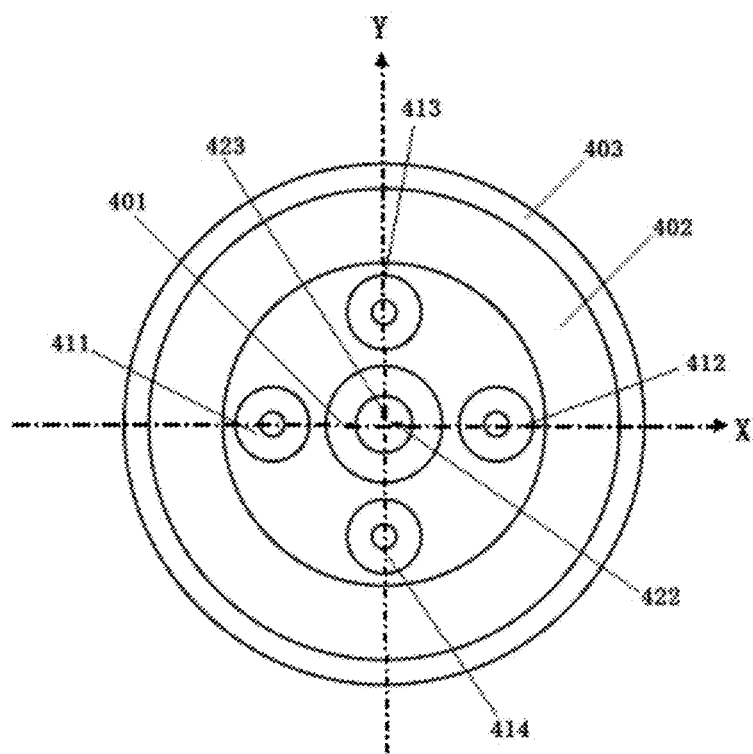
FIG. 9 is a top view of the magnetic suspension mechanism shown in FIG. 8.

FIGS. 8-9 show another specific embodiment of the suspension body and the corresponding magnetic suspension mechanism in the magnetic suspension apparatus according to the present disclosure. Different from the embodiments shown in FIGS. 6-7, the central permanent magnet 401 is a hollow cylinder, and only two Hall sensors (422 and 423) are provided to respectively detect excitation current on X axis and Y axis, wherein the Hall sensors 422 and 423 are disposed in a central bore of the central permanent magnet 401 to reduce the number of elements and save space.

In the magnetic suspension apparatus of the present disclosure, the suspension body 1 may be manufactured as various daily necessities, decorative articles, toys or the like, for example, it may be a lamp, loudspeaker box, a terrestrial globe, a gyroscope, a photo frame, a tea set or the like. In some preferred embodiments, the magnetic suspension base 3 in the movable type magnetic suspension apparatus according to the present disclosure preferably has an enclosed housing, the magnetic suspension mechanism 4 and the displacement mechanism are all disposed in the enclosed housing, and only the suspension body 1 is disposed outside the enclosed housing. In this way, during operation of the magnetic suspension apparatus, the displacement mechanisms and the magnetic suspension mechanism 4 located in the enclosed housing are automatically controlled from outside via a controller, and people can only see, from outside, the suspension body 1 moving automatically along a predetermined trajectory.

Introduction will be given below to a specific example of application of the magnetic suspension apparatus of the present disclosure to the field of tea art demonstration. A tea cup is manufactured as a suspension body, a table in front of a viewer is manufactured as a bracket, the magnetic suspension base and displacement mechanisms are disposed in the bracket and invisible from outside, and a controller is disposed on the side of the demonstrator. After the demonstrator makes tea ready in the tea cup, he activates the controller. The vertical component displacement mechanism is activated first, and the tea cup floats into the air automatically from the table surface. Then, the horizontal component displacement mechanism is activated, and the tea cup automatically drifts before the viewer. The viewer picks up the tea cup from air and tastes the tea. The demonstration procedure can present a magic and marvelous experience to the viewer.

Those skilled in the art should appreciate that the above implementations only function to illustrate the present disclosure, not to impose any limitations thereto. For example, the annular permanent magnet 402 is not limited to a single annular permanent magnet, it may be a group of more than three column-shaped permanent magnets distributed annularly in the horizontal plane, or a combination formed by vertically laminating an annular permanent magnet and the annularly-distributed and column-shaped permanent magnet group. The electromagnets are not limited to four electromagnets, and they may be in any number that can be divided into more than two groups (each group at least including an electromagnet) to control the two freedoms in the horizontal direction, for example 6; correspondingly, any number of sensors are feasible so long as they can control the suspension body to two-dimensionally move freely in the horizontal direction. In addition, there may be many types of electromagnet arrangement manners. The electromagnets may be disposed inside, outside or on the annular permanent magnet 402, or may be arranged at an interval with the plurality of column-shaped permanent magnets forming the annular permanent magnet 402 in the circumferential direction. In addition, the electromagnets are not limited to coils each having an iron core, and coreless coils may be used as the electromagnets.

What is claimed is:

1. A movable type magnetic suspension apparatus, comprising:
   a suspension body having a magnet; and
   a magnetic suspension base, comprising:
      a magnetic suspension mechanism for suspending the suspension body at a predetermined distance thereabove; and
      a displacement mechanism for displacing the magnetic suspension mechanism to enable the suspension body in the suspended state to displace correspondingly;
   wherein the displacement mechanism comprises:
      a horizontal component displacement mechanism for enabling the magnetic suspension mechanism to displace in a horizontal direction; and wherein
      the horizontal component displacement mechanism is a horizontally rotational displacement mechanism for enabling the magnetic suspension mechanism to make rotational movement in a horizontal plane.

2. The magnetic suspension apparatus according to claim 1, wherein the displacement mechanism comprises:
   a vertical component displacement mechanism for enabling the magnetic suspension mechanism to displace in a vertical direction.

3. The magnetic suspension apparatus, according to claim 1, wherein the displacement mechanism comprises:
   a turn-over displacement mechanism for enabling the magnetic suspension mechanism to turn and tilt.

4. The magnetic suspension apparatus according to claim 3, wherein the turn-over displacement mechanism is a rotary guide rail, and the magnetic suspension mechanism is capable of moving along the rotary guide rail.

5. The magnetic suspension apparatus according to claim 3, wherein the turn-over displacement mechanism is a mechanism enabling the magnetic suspension mechanism to turn about its own horizontal axis.

6. A movable type magnetic suspension apparatus, comprising:
   a suspension body having a magnet; and
   a magnetic suspension base, comprising:
      a magnetic suspension mechanism for suspending the suspension body at a predetermined distance thereabove; and
      a displacement mechanism for displacing the magnetic suspension mechanism to enable the suspension body in the suspended state to displace correspondingly;
   wherein the magnetic suspension base has a first critical anti-horizontal deviation mechanism, the suspension body has a second critical anti-horizontal deviation mechanism, the first critical anti-horizontal deviation mechanism and the second critical anti-horizontal deviation mechanism are configured to mate with each other so as to prevent the suspension body from excessive horizontal deviation which would cause failure of normal suspension of the suspension body when the suspension body is located on the magnetic suspension base and when the suspension body is at a suspension critical point while the magnetic suspension mechanism rises.

7. The magnetic suspension apparatus according to claim 6, wherein the first critical anti-horizontal deviation mechanism is an engagement protrusion disposed on a top surface of the magnetic suspension base, the second critical anti-horizontal deviation mechanism is an engagement recess disposed on a suspension bottom surface of the suspension body, and the engagement recess is configured to receive the engagement protrusion.

8. The magnetic suspension apparatus according to claim 7, wherein the engagement protrusion is cylindrical or truncated conical, and the engagement recess is cylindrical or truncated conical correspondingly.

9. The magnetic suspension apparatus according to claim 6, wherein the first critical anti-horizontal deviation mechanism is an engagement concave formed on a top surface of the magnetic suspension base, the second critical anti-horizontal deviation mechanism is formed by an outer profile of the suspension body itself so that the suspension body is received in the engagement concave in a manner that the horizontal movement is limited.

10. The magnetic suspension apparatus according to claim 6, wherein the displacement mechanism is a conveying cart, and the magnetic suspension mechanism is carried by the conveying cart.

11. The magnetic suspension apparatus according to claim 6, wherein the displacement mechanism is a guide rail device having a predetermined path and configured to enable the magnetic suspension mechanism to displace along its predetermined path.

12. The magnetic suspension apparatus according to claim 6, further comprising a controller for controlling the displacement mechanism.

13. An automatic magnetic suspension apparatus, comprising:
   a suspension body having a magnet and having a self-rotation axis; and
   a magnetic suspension base, comprising:
      a magnetic suspension mechanism for enabling the suspension body to suspend at a predetermined distance thereabove in a way of freely rotating about its self-rotation axis; and
      a lifter for lifting the magnetic suspension mechanism,
   wherein the magnetic suspension base has a first critical anti-horizontal deviation mechanism, the suspension body has a second critical anti-horizontal deviation mechanism, the first critical anti-horizontal deviation mechanism and the second critical anti-horizontal deviation mechanism are configured to mate with each other to prevent the suspension body from excessive horizontal deviation that would cause failure of normally automatic float of the suspension body from the magnetic suspension base when the suspension body is located on the magnetic suspension base and when the suspension body is at a suspension critical point while the magnetic suspension mechanism rises.

14. The magnetic suspension apparatus according to claim 13, wherein the first critical anti-horizontal deviation mechanism is an engagement protrusion disposed on a top surface of the magnetic suspension base, the second critical anti-horizontal deviation mechanism is an engagement recess disposed on a suspension bottom surface of the suspension body, and the engagement recess is configured to initially receive the engagement protrusion.

15. The magnetic suspension apparatus according to claim 14, wherein the engagement protrusion is cylindrical or truncated conical, and the engagement recess is cylindrical or truncated conical correspondingly.

16. The magnetic suspension apparatus according to claim 13, wherein the first critical anti-horizontal deviation mechanism is an engagement concave formed on a top surface of the magnetic suspension base, the second critical anti-horizontal deviation mechanism is formed by an outer profile of the suspension body itself so that the suspension body is received in the engagement concave in a manner that the horizontal movement is limited.

17. The magnetic suspension apparatus according to claim 13, wherein one of the first critical anti-horizontal deviation mechanism and second critical anti-horizontal deviation mechanism is an engagement recess having a vertical centrosymmetrical axis, the other of the first critical anti-horizontal deviation mechanism and second critical anti-horizontal deviation mechanism is an engagement protrusion having a vertical centrosymmetrical axis, and the vertical centrosymmetrical axis of the engagement recess, the vertical centrosymmetrical axis of the engagement protrusion and the self-rotation axis of the suspension body substantially overlap during automatic suspension of the suspension body from the magnetic suspension base.

18. The magnetic suspension apparatus according to claim 13, wherein one of the first critical anti-horizontal deviation mechanism and second critical anti-horizontal deviation mechanism is an engagement recess, the other of the first critical anti-horizontal deviation mechanism and second critical anti-horizontal deviation mechanism is an engagement protrusion, and the engagement recess receives the engagement protrusion and they form a clearance fitting when the suspension body is initially placed on the magnetic suspension base; during automatic suspension of the suspension body from the magnetic suspension base, the engagement recess and the engagement protrusion substantially align along the self-rotation axis of the suspension body.

* * * * *